United States Patent
Grimsrud (10) Patent No.: US 12,247,545 B2
(45) Date of Patent: Mar. 11, 2025

(54) WIND TURBINE WITH FLOATING FOUNDATION

(71) Applicant: BRUNEL FLOATING AS, Oslo (NO)

(72) Inventor: Geir Grimsrud, Son (NO)

(73) Assignee: BRUNEL FLOATING AS, Oslo (NO)

( * ) Notice: Subject to any disclaimer, the term of this patent is extended or adjusted under 35 U.S.C. 154(b) by 0 days.

(21) Appl. No.: 18/245,663

(22) PCT Filed: Sep. 17, 2021

(86) PCT No.: PCT/EP2021/075582
§ 371 (c)(1),
(2) Date: Mar. 16, 2023

(87) PCT Pub. No.: WO2022/058476
PCT Pub. Date: Mar. 24, 2022

(65) Prior Publication Data
US 2024/0011467 A1  Jan. 11, 2024

(30) Foreign Application Priority Data

Sep. 18, 2020  (NO) ................................. 20201030

(51) Int. Cl.
*F03D 13/25* (2016.01)
*B63B 35/44* (2006.01)
*B63B 75/00* (2020.01)

(52) U.S. Cl.
CPC ............ *F03D 13/256* (2023.08); *B63B 35/44* (2013.01); *B63B 75/00* (2020.01); *B63B 2035/446* (2013.01); *F05B 2240/93* (2013.01)

(58) Field of Classification Search
CPC ........ F03D 13/22; F03D 13/25; F03D 13/256; F03D 7/0202; F05B 2240/93;
(Continued)

(56) References Cited

U.S. PATENT DOCUMENTS 2,299,307 A * 10/1942 Cornell .................. F28F 19/00
                                                    241/23
9,976,540 B2    5/2018 Guyot
(Continued)

FOREIGN PATENT DOCUMENTS

CN    108316336 A    7/2018
CN    108385708 A    8/2018
(Continued)

OTHER PUBLICATIONS

Altmann, Thomas; International Search Report; PCT/EP2021/075582; Date of Mailing: Aug. 12, 2021; 5 pages.

*Primary Examiner* — Elton K Wong
(74) *Attorney, Agent, or Firm* — Bradley Arant Boult Cummings LLP (57) ABSTRACT

A wind turbine, having a floating foundation (1), a support structure (2) and a generator (3). The generator (3) is an up-wind generator. The floating foundation (1) is assembled from tubular steel sections (5, 6, 7, 8) of uniform diameter, forming a frame with a mooring turret (4) at one corner. The support structure (2) hays at least two beams (11, 12) extending substantially transverse to the floating foundation (1). The beams are connected at a first end to a respective opposite side of said foundation frame and at a second end to said nacelle (17). The support structure (2) and the floating foundation (1) form a triangle with the nacelle (17) fixedly mounted at the apex. The support structure (2) comprises tensioned backstays (13, 14, 15, 16) supporting the beams (11, 12) and ensuring that they are substantially subjected to compression forces only.

11 Claims, 5 Drawing Sheets

(58) Field of Classification Search
CPC ......... F05B 2240/931; F05B 2240/932; B63B 75/00; B63B 35/44; B63B 2035/4433; B63B 2035/446; B63B 73/43; B63B 73/49

See application file for complete search history.

(56) References Cited

U.S. PATENT DOCUMENTS

| | | | |
|---|---|---|---|
| 10,259,542 B2 | 4/2019 | Grossmann et al. | |
| 2004/0103655 A1* | 6/2004 | Lauritsen | F03D 13/25 60/398 |
| 2012/0043763 A1 | 2/2012 | De Boer | |
| 2013/0019792 A1* | 1/2013 | Jahnig | B63B 3/04 114/267 |
| 2015/0252791 A1* | 9/2015 | Taub | B63B 77/10 405/209 |
| 2015/0367918 A1 | 12/2015 | Roddier et al. | |
| 2016/0061192 A1* | 3/2016 | Guyot | F03D 13/20 416/85 |
| 2017/0190391 A1* | 7/2017 | Siegfriedsen | B63B 35/44 |
| 2017/0218919 A1 | 8/2017 | Wong | |
| 2018/0105235 A1* | 4/2018 | Zou | B63B 35/44 |
| 2019/0211804 A1 | 7/2019 | Siegfriedsen | |
| 2020/0173422 A1* | 6/2020 | Casanovas Bermejo | F03D 13/40 |
| 2020/0391834 A1* | 12/2020 | Colmard | B63B 77/10 |

FOREIGN PATENT DOCUMENTS

| | | |
|---|---|---|
| DE | 19846796 A1 | 4/2000 |
| DE | 102013005299 A1 | 10/2014 |
| DE | 102018113470 A1 | 12/2019 |
| EP | 2789848 B1 | 9/2016 |
| EP | 3388664 A1 | 10/2018 |
| GB | 2446477 A | 8/2008 |
| WO | WO-2013084856 A1 | 6/2013 |
| WO | WO-2013084878 A1 | 6/2013 |
| WO | WO-2019234490 A1 | 12/2019 |
| WO | WO-2020168343 A2 | 8/2020 |

* cited by examiner

WIND TURBINE WITH FLOATING FOUNDATION

TECHNICAL FIELD

The present invention concerns a floating wind turbine, as defined in the preamble of the subsequent claim 1.

BACKGROUND ART

Sea-based wind turbines have been known in the art for many years. These can be divided into two types, turbines having a foundation that is placed on the seabed and turbines that float in the water and is merely attached to the seabed by mooring. The latter can move relative to the seabed as far as the mooring allows. The first full-scale floating wind turbine was deployed as late as in 2009.

As criticism against land-based wind turbines in recent years has increased due to their interference with nature, sea-based wind turbines are becoming increasingly more interesting as an alternative.

However, sea-based wind turbines are more expensive both to install and to maintain than land-based turbines. Over the years, many attempts have been made to design sea-based wind turbines that are less costly but still reliable and durable.

Both on land and at sea there are two main types of wind generators, up-wind generators and down-wind generators. An up-wind faces into the wind with the turbine blades in front of the nacelle while a down-wind generator has blades to the rear of the nacelle and faces away from the wind. Up-wind generators are by far the most common, but down-wind generators are also used in certain situations.

In very strong winds the turbine blades of a wind turbine generator flex under enormous forces. With a down-wind turbine the blades flex away from the mast which prevents them from crashing into it. Up-wind generators need to be designed so that the blades are positioned at a good distance from the mast, and they must also be engineered to be inflexible (which costs more money). In addition, when the blades of a down-wind generator bend it reduces the stresses on the mast as wind energy is lost in bending the blades. Finally, down-wind generators do not need a tail (or motorised yaw mechanism) to align them with wind as the blades perform this task.

Down-wind generators lead to blade mass and cost reductions compared to equivalent upwind configurations.

Down-wind generators on the other hand are generally noisier, and the blades are subject to more forces than those of up-wind generators. Another serious disadvantage of a down-wind generator is wind shadow behind the mast causing a drop in power each time a blade passed behind the mast.

It is significantly simpler to design and build a floating down-wind turbine than an up-wind turbine. An up-wind turbine must be controlled continuously by rotating the nacelle to keep the rotor up against the wind, as the wind acting on the turbine will attempt to rotate the whole floating foundation and bring the rotor out of its orientation against the wind.

Due to the above, an up-wind generator is heavier and more complex than a down-wind generator. An up-wind generator has on the other side great advantages in performance. Consequently, up-wind generators has since long been the preferred type of generator for land-based wind turbines, and serial production of up-wind generators has made these both cheaper and more readily available than down-wind generators. The result is that a lighter and more convenient down-wind generator for floating installations will in fact become far more expensive than an up-wind generator. It has to be custom-built and a serial production of such generators cannot be envisaged in the near future. It is not possible to simply take an up-wind generator and modify this to work as a down-wind generator, as the trust bearing will be at the wrong side of the rotor. Changing the placement of the trust bearing will involve a complete redesign of the generator.

Although, there is a great variety of floating wind turbines known in the art, the known floating turbine designs are almost exclusively down-wind turbines. The floating wind turbine industry is still very small, and it will take many years until the number of deployments reaches a volume that makes serial production of down-wind generators feasible.

Among the great selection of floating wind turbines are the following:

U.S. Pat. No. 10,259,542 shows a floating structure having buoyant bodies in the form of hollow cylinders at the corners thereof. A wind generator tower is arranged with equidistance to each corner. It is not stated if this is an up-wind or down-wind generator, but it is likely that it is a down-wind generator. If it is up-wind it would be very difficult to keep the floating structure from rotating as the wind acts on the wind generator. At least it must have a yaw mechanism to constantly rotate the nacelle against the wind. In addition, the generator is arranged on top of a single free-standing tower. This tower must be sturdy to withstand the substantial stresses imposed by the wind acting on the rotor, which means that the tower and its attachment to the foundation will be heavy.

CN108385708A shows a floating structure with a plurality of wind generators. The floating structure is moored at a single central point. As the floating structure will rotate when subjected to wind, the generators have to be down-wind generators. As for the U.S. Pat. No. 10,259,542, the generators are at the top of free-standing towers, and hence the structure is heavy.

EP2789848B1 shows an up-wind generator. The problem to be solved by the invention of this reference is to stably moor the floating structure. To achieve this, a sophisticated and probably very taut mooring system is deployed. The mooring forces would require a very robust floating structure, which in turn becomes heavy and expensive. As for the preceding solutions, the generator is at the top of a free-standing tower, and hence the structure will be heavy.

US20170190391A1 shows a down-wind two-blade generator having a floating structure moored at a single point on the up-wind side of the generator. In this solution, the generator is arranged at the top of a mast that is supported by backstays. This ensures a lighter construction, but care must be taken for the backstays not to interfere with the rotor.

U.S. Pat. No. 9,976,540 shows a wind generator having which is supported at both the up-wind and down-wind side. This requires a custom-built generator. The floating structure as such is similar to US20170190391A1.

US20190211804A1 shows a floating foundation with two down-wind turbines. The Y-shaped mast is supported by backstays.

US20170218919A1 shows a floating foundation with three or more up-wind turbines arranged at each of three corners. The single mooring point is situated closer to two of the generators than the third generator, so that the wind will turn the floater until the rotors are up-wind. The rotors are arranged on top of free-standing towers, which call for a heavy and sturdy structure.

WO2019234490A1 shows a floating foundation with a down-wind generator. The solution is very similar to US20170190391A1.

EP3388664A1 shows a floating foundation having two up-wind generators. The foundation is moored at a single point up-wind of the wind generators. An alignment means, such as hydraulic cylinders are arranged to shift the single mooring point relative to the foundation in order to compensate for misalignment with the wind direction. Although, such an alignment means may ensure that the rotors are better aligned with the wind, it will inevitably add to complexity and weight. Moreover, the wind generators are arranged on free-standing towers, which will have to be sturdy and hence heavy-weight.

CN108316336A shows a floating foundation with a free-standing tower for a wind generator. The foundation is symmetrical in the horizontal plane, and hence it must be tautly moored if an up-wind generator is to be used. The generator must also have a yaw mechanism. The free-standing tower makes a heavy and sturdy structure.

SUMMARY OF INVENTION

The present invention therefore has as an object to provide a floating wind turbine that despite the use of an up-wind generator is lightweight and simple in construction. By such a lightweight and simple construction, the wind turbines can be subjected to serial production using mainly parts that either are readily available in the market or can be produced at a wide range of steel structure manufacturer. The parts can be assembled locally without the need for special equipment.

This is achieved by the features defined in the appended claim 1.

DETAILED DESCRIPTION OF THE INVENTION

Figure 1:
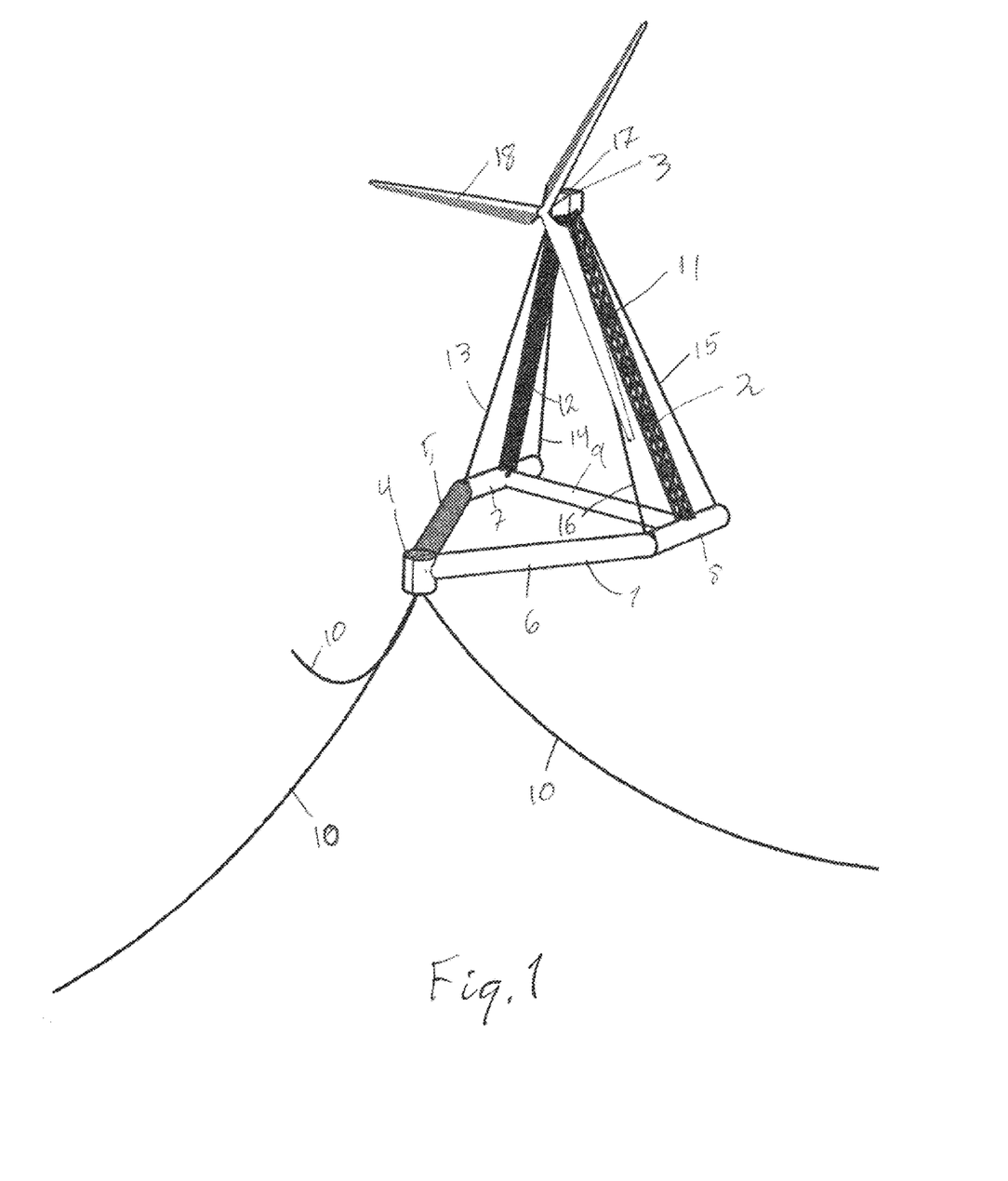
FIG. 1 shows the floating wind turbine of the present invention in isometric view.

FIG. 1 shows an exemplary embodiment of the wind turbine of the invention in isometric view. The turbine comprises a floating foundation 1, a support structure 2 and a generator 3. The foundation 1 in general comprises rolled tubular steel sections that form a general A-shape with a turret 4 at its apex, two first sections 5, 6 extending from the turret with an angular separation of about 45°, two further sections 7, 8 extending in parallel from the free end of each of the first sections 5, 6 and a transverse tubular section 9 connecting the two further sections 7, 8.

The foundation 1 is airtight and will have sufficient buoyancy to support the support structure 2 and generator 3. The interior of the foundation 1 may be divided into a multiple of compartments to allow for adjustment of the buoyancy.

The turret 4 accommodates a swivel (not shown) to which mooring lines 10 are to be attached. The mooring lines 10 are at the opposite ends attached to anchors (not shown). The anchors may be of any type suitable for long time mooring, such as suction anchors, piles, drag anchors, mushroom anchors, augers or dead-weights. The lines 10 extends in a catenary fashion between the anchor and the turret 4. This allows for the foundation to move to somewhat relative to the seabed, both in horizontal and vertical directions. The mooring forces in this type of mooring will be lower than a tensioned mooring.

The support structure 2 comprises two truss beams 11, 12. Each beam 11, 12 is attached to further sections 7, 8 of the foundation 1 close to where the transverse section 9 is attached. The truss beams 11, 12 extends to the generator 3, which is fixedly attached to the beams 11, 12. The beams 11, 12 may be attached to one another at their upper ends but may also be coupled via the generator 3.

It is also conceivable within the ambit of the invention to use pipe sections instead of truss beams. As will be explained below, the support structure will substantially be subjected to compression forces only. Consequently, the pipe sections for the support structure 2 need not have the same diameter and wall thickness as the tubular sections of the floating foundation 1.

The support structure 2 can also comprise a set of backstays, such as four backstays 13, 14, 15, 16. The backstays 13, 14, 15, 16 extend from close to the upper end of the truss beams 11, 12 to each end of the further tubular sections 7, 8.

In order for the generator rotor not to interfere with the backstays 13, 14, 15, 16, the truss beams 11, 12 are leaning towards the turret 4 at an angle.

The generator 3 comprises a nacelle 17 that is fixedly attached to the upper ends of the beams 11, 12. A rotor 18, preferably with three blades is rotatably attached to the nacelle. Both the nacelle and the rotor are standard mass-produced units.

Figure 2:
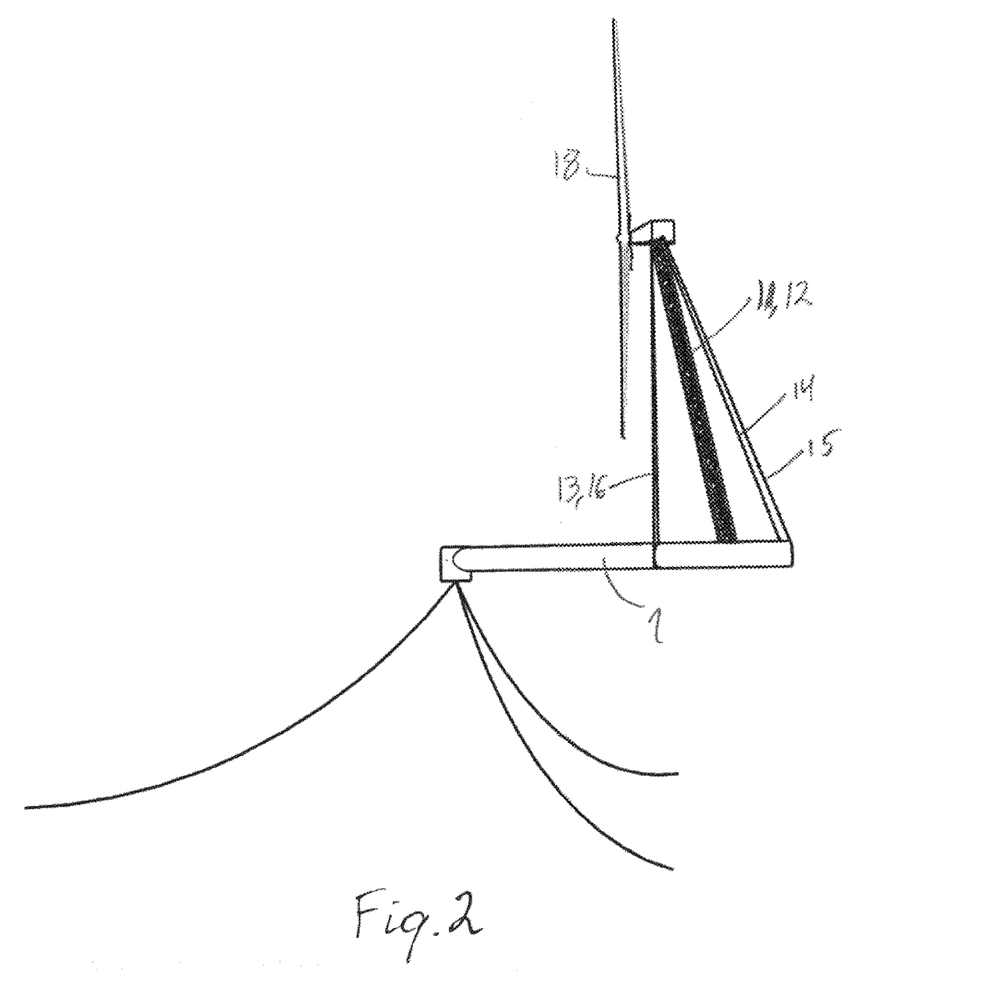
FIG. 2 shows the wind turbine of FIG. 1 in a side elevation view.

FIG. 2 shows the turbine in a side elevation view. As can be seen in this view, the up-wind backstays 13, 16 extend practically in a vertical plane and the rotor 18 is also arranged in a vertical plane, while the truss beams 11, 12 form an angle of about 15° with the vertical plane. The down-wind backstays 14, 15 form an angle of about 25° with the vertical plane. The foundation 1 is designed to float substantially horizontally.

Figure 3:
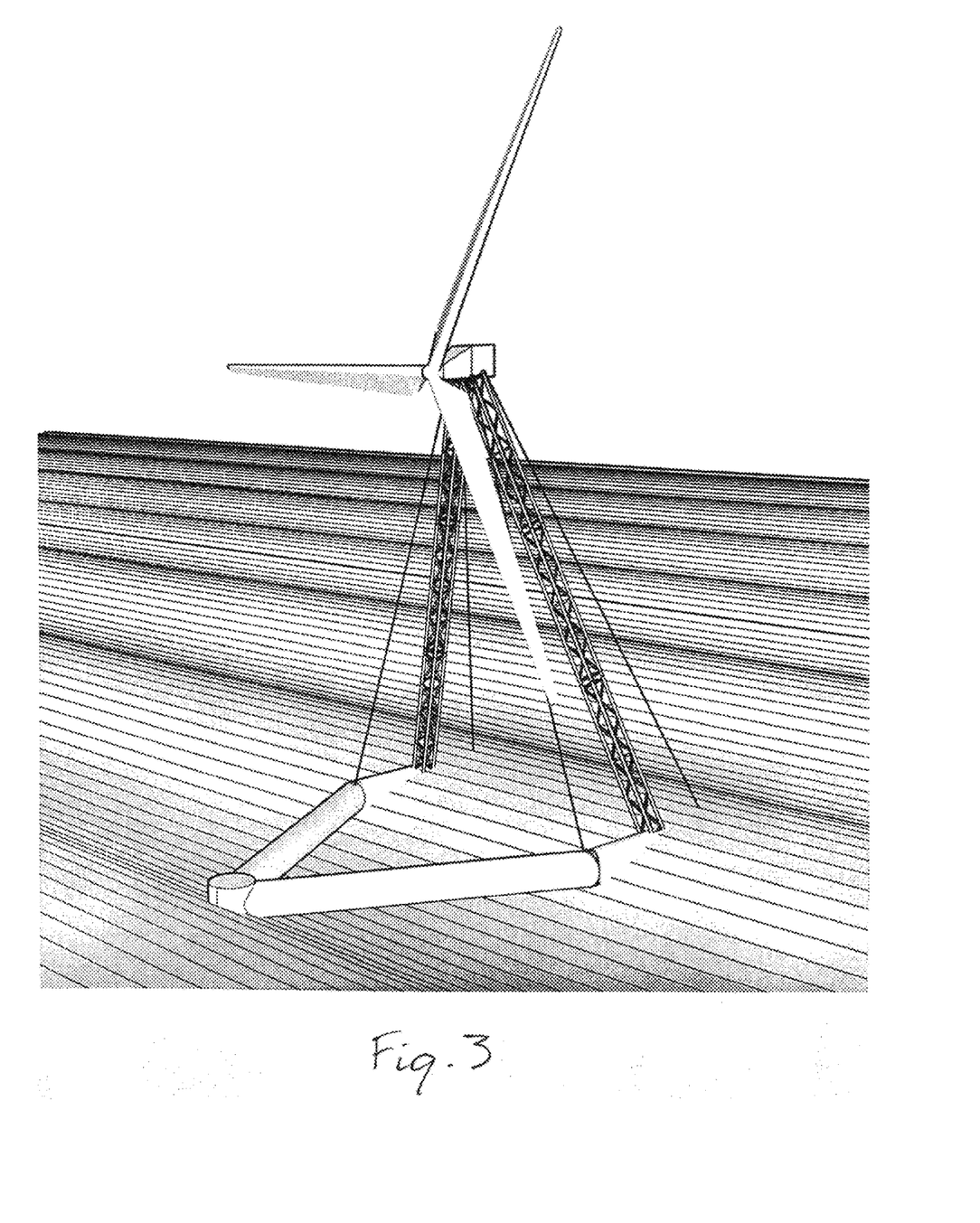
FIG. 3 shows the wind turbine of FIG. 1 floating in a body of water.

FIG. 3 shows the turbine floating at sea and subjected to waves. Waves are allowed to wash over the tubular sections of the foundation 1. Due to the relatively small diameter of the tube sections, it is expected that the forces from wave and current will be small. This reduces the mooring forces.

The truss beams may be of the same design as used for crane booms. These are known to be light weight but have a great strength.

Figure 4:
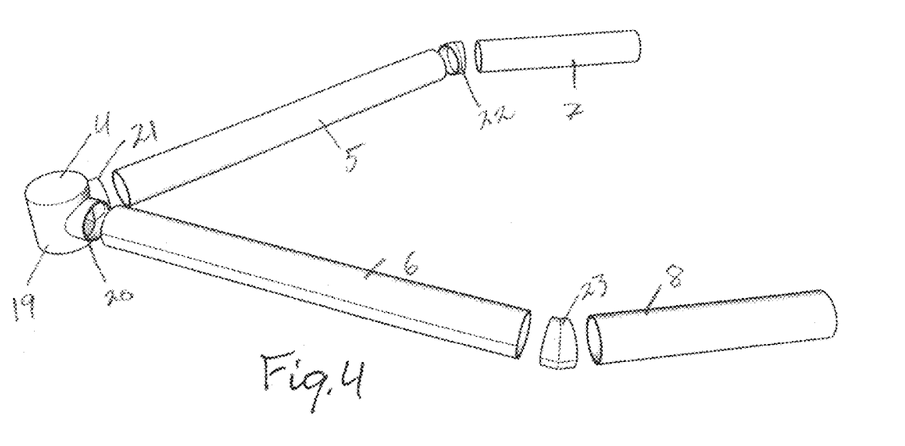
FIG. 4 shows the base part of the foundation in exploded view.

FIG. 4 shows the substantial part of the foundation 1 in an exploded view. The turret 4 basically comprises a cylindrical part 19 with short tubular connection pieces 20, 21 welded to the side thereof. The cylindrical part is open at the lower end (not shown) to receive the swivel (not shown) and closed at its upper end. The cylindrical part 19 may have a larger diameter than the connection pieces 20, 21, but is preferably made from the same tube as the remaining tubular parts of the foundation 1.

The first sections 5, 6 and the further section 7, 8 are uniform rolled steel tubes having the same diameter. Consequently, these sections can be formed from a continuous length of tube that is cut into proper length.

To connect the first sections 5, 6 with the further sections 7, 8 connection pieces 22, 23 have each been formed by two short tubular pieces that are cut at an angle and welded together to extend from one another at the angle intended for the joining of the first sections 5, 6 and the further sections 7, 8.

The sections 5, 6, 7, 8 is preferably connected to the connection pieces by bolts. This facilitates transport of the parts to an assembly site where the foundation 1 can be assembled using simple tools. It is however also possible to weld the parts together or use a combination of welds and bolts.

The transverse section 9 is not shown in FIG. 4. This section is an option, which may be omitted if it is not proven necessary. The transverse section 9 will enhance the stiffness and buoyancy of the foundation 1. Short connecting pieces may be welded to the further sections 7, 8 to allow for a bolted connection of the transverse section 9 to the further sections 7, 8.

The tube sections are preferably made airtight, e.g., by welding a bulkhead (not shown) inside the sections, close to each end thereof. If it is desired to divide a section into further compartments, further bulkheads may be welded into the tubes. If it is desired to be able to adjust the buoyancy, holes (not shown) for valves can be made at appropriate places on the tube sections to allow for flowing air or/and water into or out of compartments in the tube sections.

The tube sections 5-8 should be pressure tested before assembly.

Figure 5:
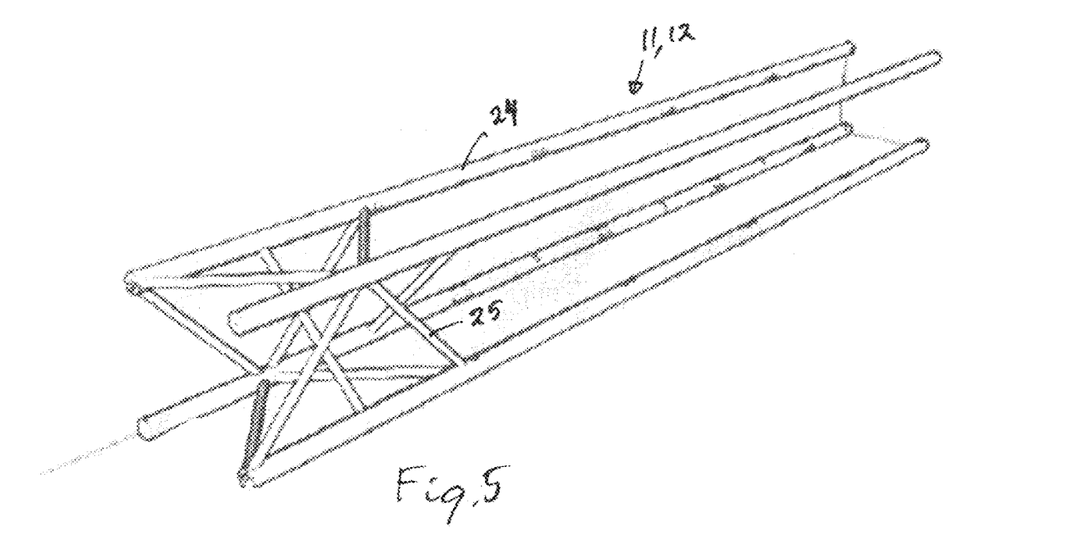
FIG. 5 shows a truss structure of the turbine during manufacture.

FIG. 5 shows a part of a truss beam 11, 12. These beams preferably have a uniform cross section along their length so that they can be manufactured from identical truss sections. Each truss section is preferably welded by welding robots in a line production operation. The truss sections are preferably connected to complete beams by bolts. As stated above, it is possible to use pipe sections instead of truss sections.

Although, a square cross-section with four corner rods 24 that are interconnected by a plurality of inclined rods 25 are shown for the truss beams, they may have any suitable cross section, such as triangular.

The truss beams are preferably bolted to the foundation, to one another and to the nacelle.

The assembly of the turbine can be done as follows:

The tube sections and truss sections are made short enough to facilitate transport by conventional ships and lorries, preferably in ISO containers.

At the assembly site, which conveniently is a port where the wind turbine can be transferred to an installation ship or barge, the parts are assembled by bolting the tube sections together. The swivel is installed in the turret cylinder part 19. The assembly may be done on shore and the complete wind turbine subsequently lifted onto a ship or barge, or the assembly may be done on the deck of a ship or barge. In the latter case, the assembly may at least partly be done while the ship or barge is sailing to the installation site.

When the tube sections 5-8 have been bolted together, the truss sections 11, 12 are assembled and connected to the foundation 1.

The wires 13-16 are then connected at their lower ends to the foundation and at their upper ends to (or close to) the upper ends of the truss beams. The wires may alternatively be connected to the nacelle. The wires are tightened to a predetermined tension. The wires ensure that the truss beams are always kept in compression, as the wires will take up substantially all moments.

Mounting of the nacelle and the rotor may also take place while the foundation is afloat.

Cables for power and signal will be connected to the nacelle 17 and fed through the truss beams 11, 12. A coupling for the electric cables may conveniently be installed at the lower end of one of the truss beams 11, 12, so that a power line, that may have already been installed at the installation site, may easily be connected to the wind turbine upon installation.

The mooring lines, which have already been deployed, are coupled to the turret 4 upon installation.

The wind turbine is deployed either by lifting it from the deck and into the water or by de-ballasting a barge, upon which the wind turbine is situated, until the wind turbine is afloat.

When deployed, the wind turbine functions are tested, and the wind turbine is left to produce electric power.

The steel tube sections and truss beams are made of a selected steel grade that has been known for many years to endure harsh conditions and salt water in the offshore oil and gas industry. When the time for supervision and maintenance of these structures is reached, the wind turbine may be brought onto the deck of a vessel and either maintained on the deck or brought to the shore. It may also be towed to the shore.

Maintenance of the nacelle can be done by climbing a ladder (not shown) within the truss beams 11, 12. An elevator may also be installed inside the truss beams 11, 12 to bring people and parts up to the nacelle.

When the rotor blades need to be changed, this can either be done by lifting the blades from the wind turbine while it is floating (as is common practice with most sea based wind turbines today) or by bringing the turbine onto the deck of a vessel.

Figure 6:
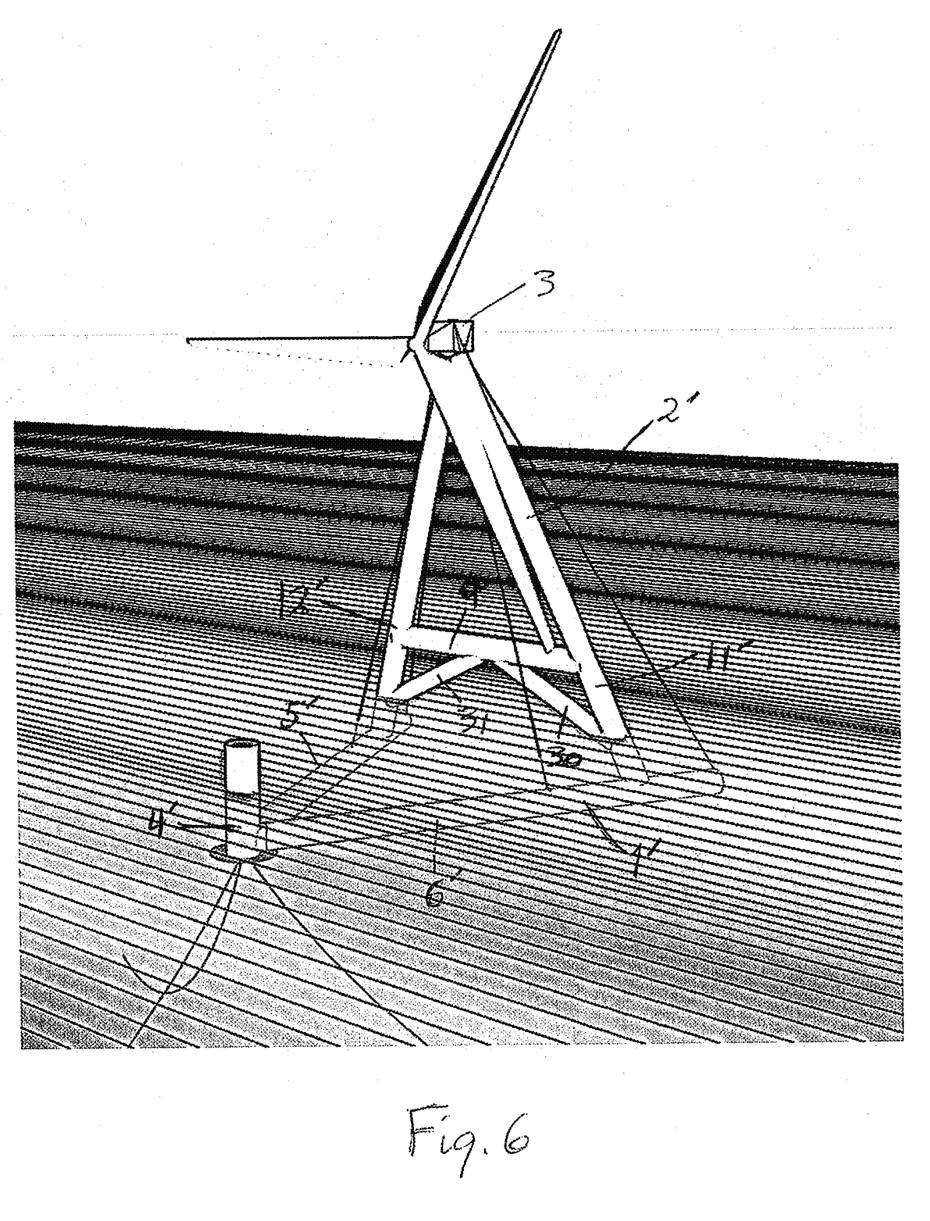
FIG. 6 shows an alternative embodiment of the invention.

FIG. 6 shows an alternative embodiment of the invention. This embodiment is very similar to the embodiment of FIGS. 1-5, but a few changes have been made.

Instead of the foundation 1' having five tubular sections, it has only two sections 5' and 6', extending at an angular separation from the turret 4'. The support structure 2' is also made up of tubular sections instead of truss beams. Tubular sections 11' and 12' extend from a respective side of the foundation 1' to the generator 3. Instead of the section 9 forming a part of the foundation shown in FIG. 9, the embodiment of FIG. 6 has a transverse section 9' extending between the support structure sections 11' and 12' at a location distant from the foundation 1'. Two inclined tubular struts 30, 31 extend from the tubular sections 11' and 12', respectively, to the transverse section 9'.

Next the height of the turret 4' has been elongated. This enables the foundation to be ballasted to a lower position with respect to the water surface. As shown in FIG. 6, the foundation sections 5' and 6' are situated completely below the water, while the turret 4' protrudes through the surface. This gives a very small water plane area, which is made up of the cross-sectional area of the turret and the support structure sections 11' and 12'. A small water plane area results in an improved stability and makes the floating structure less influenced by wave actions.

It is indeed possible to combine features of the embodiment of FIGS. 1-5 and 6, such as using truss beams in the embodiment of FIG. 6, or elongating the turret 4 of FIGS. 1-5 to enable the foundation to be ballasted to a position below the water surface.

With the above described designs, it is possible to manufacture a wind turbine by using standard components or at least components that are within the ambit of standardized production. The number of parts is also reduced. This lowers fabrication costs and time considerably.

The amount of material (steel weight), which is a significant part of costs, is also reduced compared to known designs. This also reduces the environmental impact.

The production can be done almost everywhere where these is an engineering industry. This facilitates production close to the deployment site, which has significance for the overall environmental impact.

The wind turbine design is scalable and only limited by the sizes of nacelle and rotor available.

Due to the turret, the foundation 1 will turn with the current and waves so that the turret will be facing the oncoming current and waves. As the currents, waves and wind generally comes from approximately the same direction, the wind will almost always be approximately up-wind of the rotor. In some situations, the wind direction may be slightly different from the direction of the current and waves, but the difference is seldom more than a few degrees. This has in total very little significance on the overall performance. Consequently, a yaw mechanism or any other active means to keep the rotor against the wind has been dispensed with.

The invention claimed is:

1. A wind turbine comprising:
a floating foundation;
a support structure;
an upwind generator comprising a nacelle and a rotor;
wherein the floating foundation is assembled from a plurality of tubular sections of uniform diameter, the plurality of tubular sections forming a foundation frame with a mooring turret at an apex of the foundation frame, the floating foundation frame being generally situated in one plane;
the support structure comprising two members extending substantially transverse to the plane of the floating foundation, each of the two beams being connected at a first end to a respective side of the foundation frame and at a second end to the nacelle;
wherein the support structure together with the floating foundation forms a triangle with the nacelle fixedly mounted at an apex of the support structure, the rotor facing the apex of the foundation frame; and
wherein in a first alternative:
the two members are two beams; and
the foundation frame comprises:
two first tubular sections of the tubular sections that extend from a turret at the apex thereof with an angular separation of about 45°;
two second tubular sections of the tubular sections that extend in parallel with one another from a free end of each of the two first tubular sections; and
a transverse tubular section connecting the two second tubular sections; and
wherein the two beams are attached adjacent to each end of the transverse tubular section of the foundation frame; and
wherein in a second alternative;
the foundation frame comprises two tubular sections of the tubular sections that extend from a turret at the apex thereof with an angular separation;
the two members are two support tubular sections extending from respective sides of the floating foundation; and
the support structure comprises:
a transverse section extending between the two support tubular sections at a location distant from the floating foundation; and
two inclined tubular struts extending from the two support tubular sections to the transverse section.

2. The wind turbine of claim 1, wherein the support structure comprises tensioned backstays supporting the two beams and ensuring that the two beams are substantially subjected to compression forces only.

3. The wind turbine of claim 2, wherein the support structure leans at an angle towards the apex of the foundation frame.

4. The wind turbine of claim 1, wherein the two beams are assembled from truss work sections.

5. The wind turbine of claim 4, wherein the two beams are assembled from identical truss sections manufactured by robot welding and which are connected to each other by bolted connections.

6. The wind turbine of claim 1, wherein the two beams are assembled from pipe sections.

7. The wind turbine of claim 1, wherein the floating foundation comprises straight tubular sections connected to each other by bolted connections.

8. The wind turbine of claim 7, wherein the bolted connections comprise connection pieces made from the same material as the tubular sections.

9. The wind turbine of claim 1, wherein the floating foundation comprises straight tubular sections connected to each other by welding.

10. The wind turbine of claim 1, wherein each of the tubular sections has at least one airtight compartment providing buoyancy.

11. The wind turbine of claim 1, wherein, during operation, the mooring turret protrudes through a water surface while the rest of the floating foundation is below the water surface.

* * * * *